(12) United States Patent
Iverson

(10) Patent No.: US 7,284,340 B1
(45) Date of Patent: Oct. 23, 2007

(54) PRIMARY CHAIN ADJUSTMENT MEASURING TOOL

(76) Inventor: Victor Iverson, 18 W. Rice La., Farmington, UT (US) 84025

( * ) Notice: Subject to any disclaimer, the term of this patent is extended or adjusted under 35 U.S.C. 154(b) by 172 days.

(21) Appl. No.: 11/215,955

(22) Filed: Aug. 30, 2005

(51) Int. Cl.
*G01B 5/14* (2006.01)

(52) U.S. Cl. .......................................... 33/833; 33/571

(58) Field of Classification Search ................. 33/483, 33/484, 571, 679.1, 832, 833; 7/164; 81/DIG. 5, 81/DIG. 7
See application file for complete search history.

(56) References Cited

U.S. PATENT DOCUMENTS

| | | | | |
|---|---|---|---|---|
| 2,795,157 | A | * | 6/1957 | White .......................... 81/15.8 |
| 4,157,608 | A | * | 6/1979 | Campagnolo ................... 81/68 |
| 4,210,036 | A | * | 7/1980 | Nakata ......................... 81/15.8 |
| 4,282,615 | A | * | 8/1981 | Tom ............................... 7/164 |
| 5,049,114 | A | | 9/1991 | Hayden ....................... 474/111 |
| 6,003,236 | A | * | 12/1999 | Hoeft ........................... 33/533 |
| 6,415,520 | B1 | | 7/2002 | Locklear ....................... 33/481 |
| 2002/0119849 | A1 | * | 8/2002 | Maynard ..................... 474/130 |
| 2002/0194679 | A1 | * | 12/2002 | Hawkins ........................ 7/128 |
| 2004/0255735 | A1 | * | 12/2004 | Sahag et al. .................. 81/477 |
| 2006/0219063 | A1 | * | 10/2006 | Tamamatsu .................... 81/64 |

\* cited by examiner

*Primary Examiner*—G. Bradley Bennett
(74) *Attorney, Agent, or Firm*—Thorpe North & Western LLP

(57) ABSTRACT

A tool for measuring movement of a strand of a chain extending between sprockets in a direction substantially transverse to the length of the strand, for example a primary motorcycle chain extending between a clutch sprocket and an engine compensating sprocket, wherein the movement of the chain needs to be adjusted at intervals, includes a handle section by which the tool is held and manipulated by a user. A chain engaging section is joined to the handle by an indicator section so that a user holding the handle can manipulate the chain engaging section to engage the strand of chain whose movement is to be measured. Movement of the tool will then move the chain. Indicia on the indicator section is usable to determine the movement of the chain. The tool can also be used to measure the tension of a belt or other material.

19 Claims, 2 Drawing Sheets

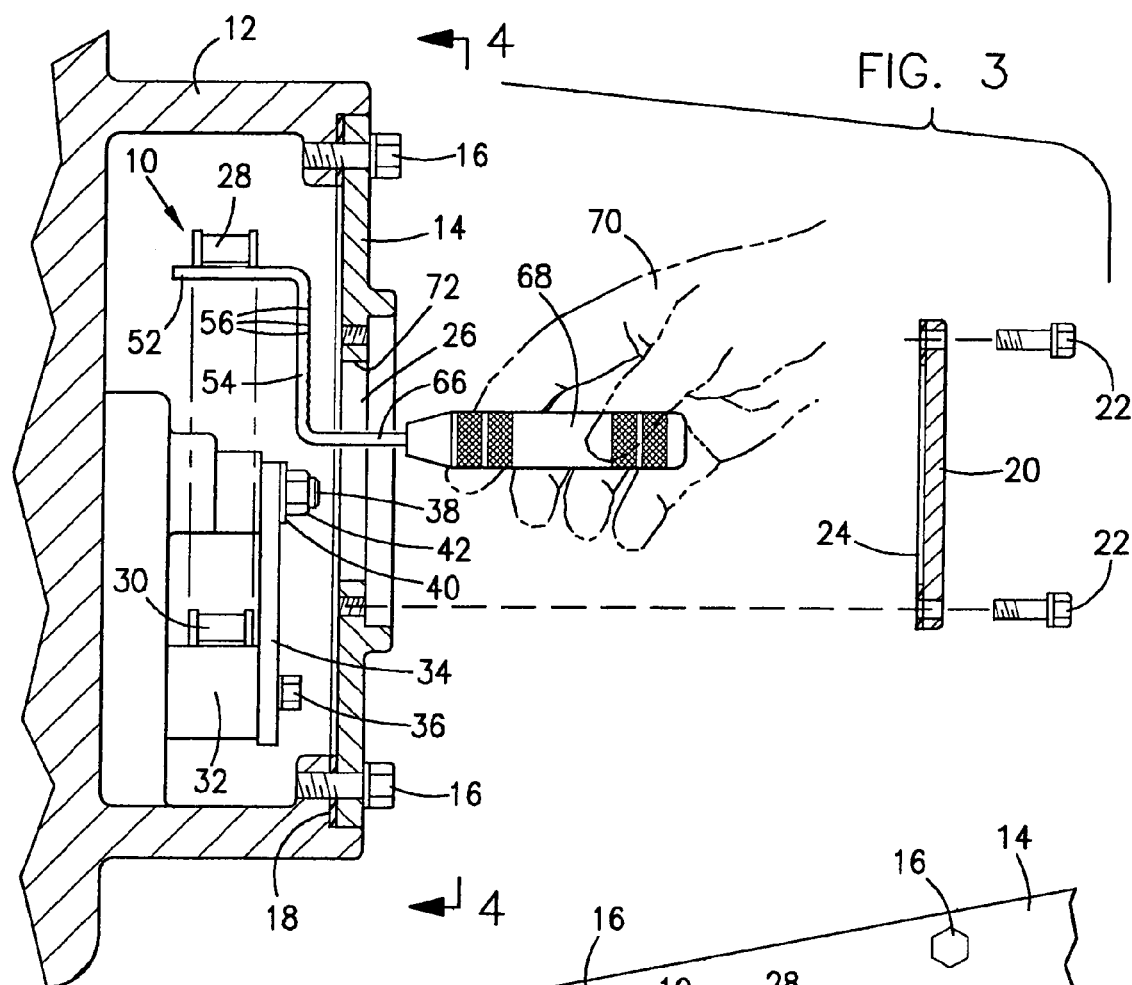
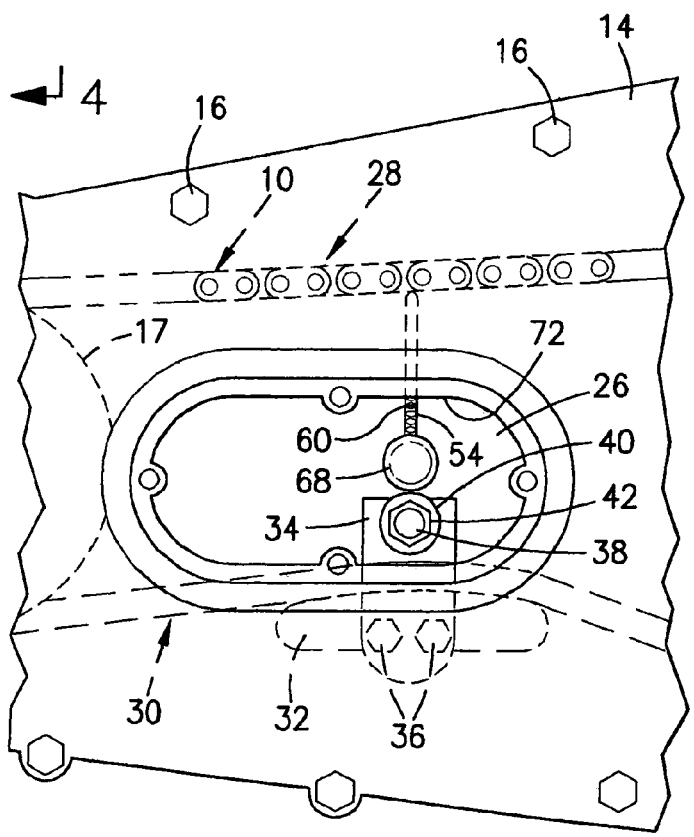
FIG. 3
FIG. 4

PRIMARY CHAIN ADJUSTMENT MEASURING TOOL

BACKGROUND OF THE INVENTION

1. Field

The invention is in the field of adjusting the tension of the primary chain in a motorcycle.

2. State of the Art

Most motorcycles have a primary chain that extends between a clutch sprocket and an engine compensating sprocket. The clutch sprocket, engine compensating sprocket, the primary chain, and a chain adjusting shoe assembly are located in a primary chain case having a primary chain case cover and a primary chain adjustment inspection cover. The lower span of the primary chain between the sprockets rides on a chain adjustment shoe of the chain adjustment shoe assembly and the chain adjustment shoe is mounted for up and down adjustment movement within the primary chain case through an adjusting shoe mounting bracket and attaching bolt. The adjustment shoe and mounting bracket can be moved up and down by loosening the bolt. Movement of the shoe adjusts the tension of the chain. This arrangement is used, for example, in Harley Davidson motorcycles with Evolution 1380 cc and 1488 cc engines. In such motorcycles, the primary chain adjustment inspection cover is removed to expose the bolt and enough of the adjustment shoe bracket to allow loosening of the bolt and movement of the bracket, which moves the adjustment shoe, for adjustment of the primary chain. However, the primary chain is not exposed with removal of the primary chain adjustment inspection cover.

Instructions from the Harley Davidson Motorcycle Handbook tell the motorcycle owner to "Inspect the chain periodically for cracked, broken or badly worn links. Chain adjustment must be inspected every 5000 miles (8000 km). As chains stretch and wear they run tighter at one spot than another. Always adjust free movement at the tightest spot in the chain to allow specified play midway between sprockets. Do not adjust tighter. Running chains too tight will result in excessive wear." The instructions then tell the owner that "Primary chain tension is adjusted by a shoe located in the primary chain case. The shoe is raised or lowered to tighten or loosen the chain. The chain should have free up and down movement in the upper strand midway between the sprockets. This deflection should be ⅝-⅞ in. (15.9-22.3 mm) with the engine cold and ⅜-⅝ in. (9.5-15.9 mm) with the engine hot." However, since the chain itself is not visible in the primary chain case with the primary chain case inspection cover removed, it is difficult to determine the play in the upper strand between sprockets.

SUMMARY OF THE INVENTION

The invention provides a handheld tool that can be used to easily determine the up and down movement in the upper strand of the primary chain between the sprockets as required in inspecting and adjusting the tension of the primary chain. The tool includes a handle section by which the tool is held by a user and a chain engaging section for engaging the upper strand of the chain. The handle and chain engaging sections are joined by an indicator section which cooperates with a top edge of an opening formed in the primary chain case cover when the primary chain adjustment inspection cover is removed to allow access to the bolt securing the chain adjustment shoe in the primary chain case. The indicator section includes gradations which can be aligned with the top edge of the opening to measure up and down movement of the tool as the tool moves the upper strand of the chain up and down. The up and down movement of the tool corresponds to the up and down movement of the upper strand of the chain. Thus, such up and down movement of the chain can be easily measured.

For use with the mentioned Harley Davidson motorcycles for which the chain movement is measured in eights of an inch, it is preferred that the gradations in the indicator section of the tool indicate eighths of an inch.

BRIEF DESCRIPTION OF THE DRAWINGS

In the accompanying drawings, which show the best modes currently contemplated for carrying out the invention:

FIG. 3, a vertical section through the primary chain case taken on the line 3-3 of FIG. 2; and FIG. 4, a fragmentary side elevation of the primary chain case and primary chain case cover with the primary chain adjustment inspection cover removed and the tool of the invention inserted into the primary chain case to measure the up and down movement of the upper strand of the chain.

DETAILED DESCRIPTION OF THE ILLUSTRATED EMBODIMENT

Figure 2:
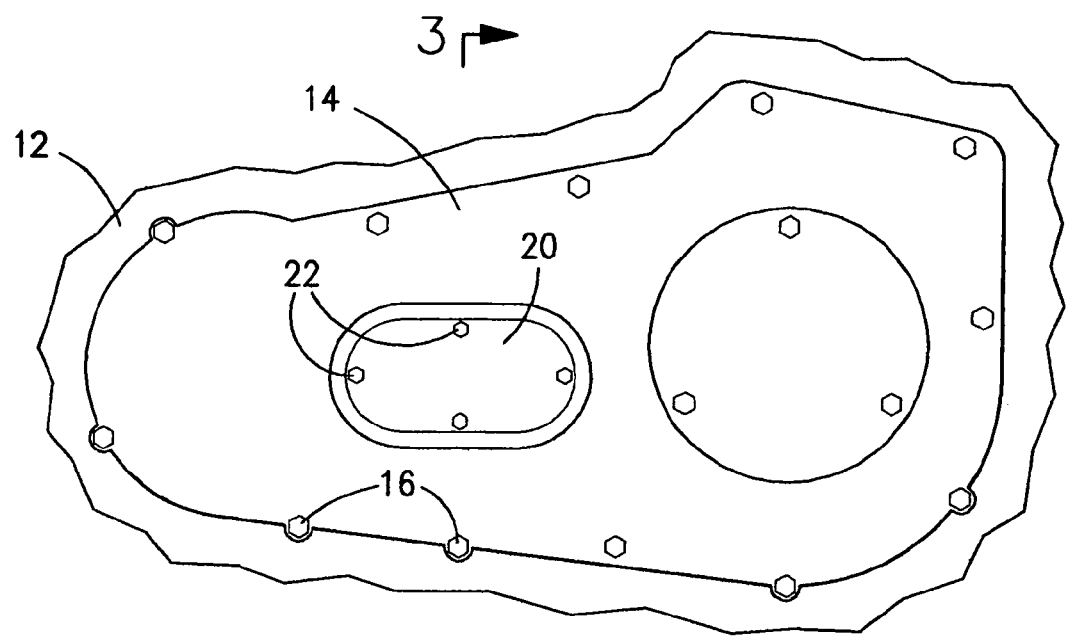
FIG. 2, a fragmentary side elevation of the primary chain case of a motorcycle showing the primary chain case cover and the primary chain adjustment inspection cover.

Most motorcycles have a primary chain 10, FIGS. 3 and 4, that extends between a clutch sprocket and an engine compensating sprocket. The clutch sprocket, engine compensating sprocket, and the primary chain 10 are located in a primary chain case 12 having a primary chain case cover 14 secured to the primary chain case 12 by bolts 16. The clutch sprocket and engine compensating sprocket are positioned at substantially opposite ends of the primary chain case with the chain extending between them. A portion of the hidden clutch sprocket is shown in broken lines 17 at the left side of FIG. 4. The engine compensating sprocket is to the right of the portion of the primary chain case shown in FIG. 4, so is not shown. A gasket 18 prevents oil leakage between the primary chain case 12 and the primary chain case cover 14. A primary chain adjustment inspection cover 20 is removably secured to the primary chain case cover 14 by bolts 22. A gasket 24 prevents oil leakage between the primary chain adjustment inspection cover 20 and the primary chain case cover 14 when the primary chain adjustment inspection cover 20 is secured to the primary chain case cover 14. Removal of the primary chain adjustment inspection cover 20 from the primary chain case cover 14, as shown in FIGS. 3 and 4, creates an adjustment and inspection opening 26 opening into the primary chain case when the primary chain adjustment inspection cover 20 is removed from the primary chain case cover 14. Primary chain 10 has an upper strand 28 and a lower strand 30. The lower strand 30 of the primary chain 10 rides on a chain adjustment shoe 32 of a chain adjustment shoe assembly which includes outer plate 34 to which chain adjustment shoe 32 is secured by bolts 36. Chain adjustment shoe 32, along with outer plate 34, is mounted on threaded stud 38 by washer 40 and nut 42 for up and down sliding adjustment movement within the primary chain case. An adjusting slot in outer plate 34, not visible behind washer 40, allows this up and down sliding adjustment movement of outer plate 34 on stud 38. Outer plate 34, along with chain adjustment shoe 32 secured thereto, can be moved up and down by loosening the nut 42. When adjusted to desired position, nut 42 is tightened to hold outer plate 34 and chain adjustment shoe 32 in adjusted position, providing the desired tightness to the primary chain 10. Movement of adjustment shoe 32 adjusts the tension of the chain. Upward adjustment of adjustment shoe 32 tightens chain 10, while downward movement of adjustment shoe 32 loosens chain 10. This arrangement is used, for example, in Harley Davidson motorcycles with Evolution 1380 cc and 1488 cc engines. In such motorcycles, the primary chain adjustment inspection cover is removed, as shown in FIG. 4, to expose the bolt 38 and enough of the adjustment shoe assembly to allow loosening of the bolt and movement of the outer plate 34, which moves the attached adjustment shoe 32, for adjustment of the primary chain. However, as can be seen in FIGS. 3 and 4, the primary chain is not exposed with removal of the primary chain adjustment inspection cover. Both the upper strand 28 and lower strand 30 of the adjustment chain remain hidden behind the primary chain case cover 14.

Instructions from the Harley Davidson Motorcycle Handbook tell the motorcycle owners that "Primary chain tension is adjusted by a shoe located in the primary chain case. The shoe is raised or lowered to tighten or loosen the chain. The chain should have free up and down movement in the upper strand midway between the sprockets. This deflection should be ⅝-⅞ in. (15.9-22.3 mm) with the engine cold and ⅜-⅝ in. (9.5-15.9 mm) with the engine hot." However, since the upper strand of the chain itself is not visible in the primary chain case during such adjustment, it is difficult to determine the play in the upper strand between sprockets and thus difficult to determine when the chain is properly adjusted. The tool of the invention allows a user to easily determine the free up and down movement in the upper strand of the chain.

Figure 1:
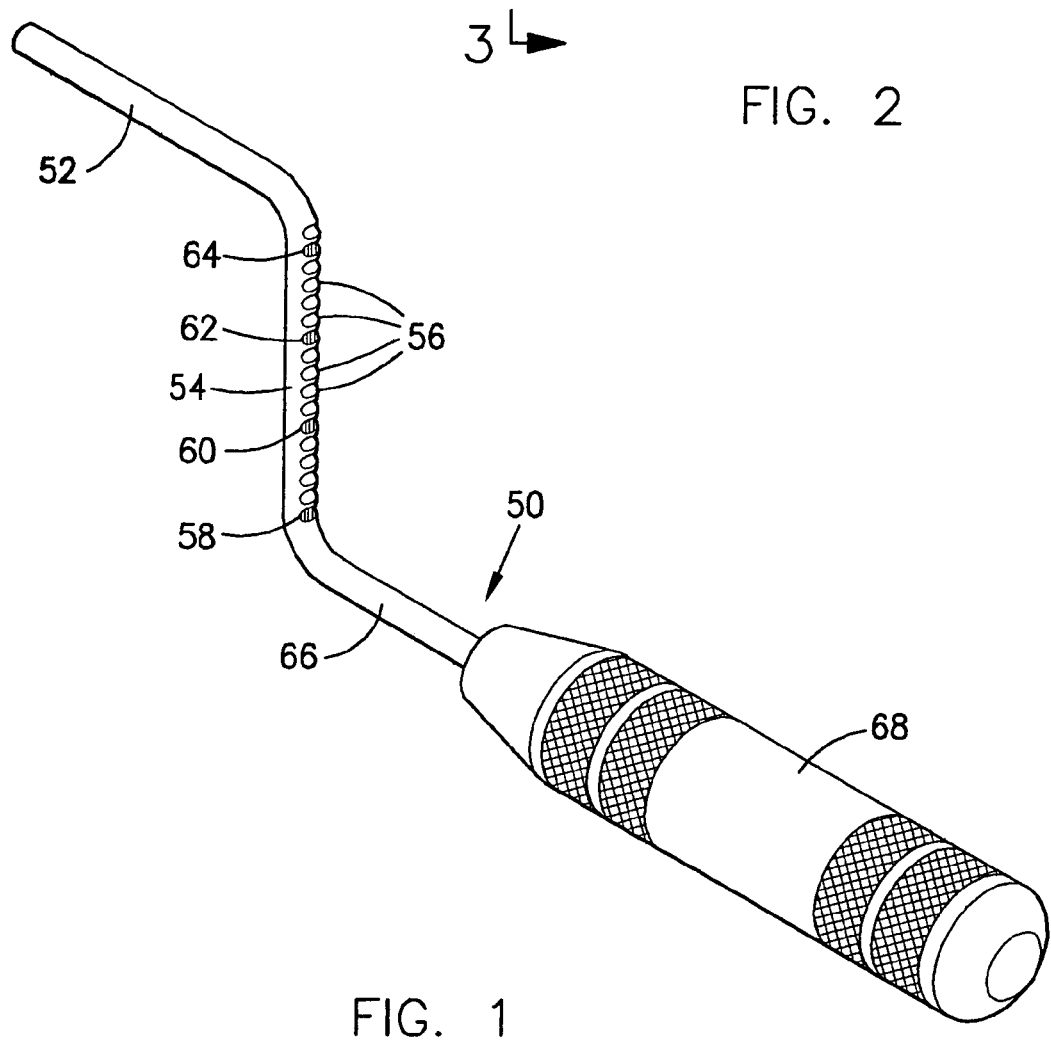
FIG. 1 is a perspective view of the tool of the invention.

The tool of the invention includes a handle section 50, FIG. 1, by which the tool is held and manipulated by a user, and a chain engaging section 52 for engaging the upper strand 28 of the chain 10. The handle section 50 and chain engaging section 52 are offset and are joined by a measuring or indicator section 54. Indicator section 54 includes gradations 56 spaced therealong. The gradations may be spaced as desired for a particular type of motorcycle with which the tool is intended to be used. For the Harley Davidson motorcycles with Evolution 1380 cc and 1488 cc engines described above, for which free up and down movement of the upper span of the chain is measured in increments of eighth inches, it is preferred that the gradations be spaced every eighth inch. It is also preferred that every fifth gradation (every five eighths of an inch), for example gradations 58, 60, 62, and 64, FIG. 1, have a distinguishing feature, such as being colored red. In this way, it is easier for a user to keep track of the gradations.

In its presently preferred form, the handle section 50 of the tool includes a rod 66 extending from an enlarged diameter handle 68 which can easily be held in the hand 70, FIG. 3, of the user. Rod 66 is bent at a substantially right angle to form the indicator section 54 and bent again at a substantially right angle to form the engaging section 52. As shown, engaging section 52 is preferably substantially parallel to, but offset from, enlarged diameter handle 68 and rod 66 as it extends from enlarged diameter handle 68, and extends from indicator section 54 in the opposite direction from handle 68. Gradations 56 may be formed in any suitable manner such as by forming indentations in section 54 as by stamping or laser engraving.

To adjust the primary chain, the primary chain adjustment inspection cover 20 is removed to allow access through opening 26 to bolt 38 securing outer plate 34 and chain adjustment shoe 32 in the primary chain case. The chain engaging section 52 and indicator section 54 of the tool of the invention is inserted through opening 26 into the primary chain case and positioned so that chain engaging section 52 abuts the bottom of the upper strand 28 of chain 10 to thereby engage the upper strand of chain 10, as shown in FIGS. 3 and 4. In such position, the tool can be moved up and down to move the upper strand 28 of chain 10 up and down. The gradations 56 on the indicator section 54 of the tool cooperate with the top edge 72, FIG. 4, of opening 26 through the primary chain case cover 14 to indicate the extent of up and down movement of the tool. Thus, a user holds handle 68, FIG. 3, in his or her hand 70, and inserts the chain engaging section 52 and indicator section 54 of the tool through opening 26 into the primary chain case and positions the chain engaging section 52 against the upper strand 28 of chain 10 about midway between the sprockets as shown in FIGS. 3 and 4. The user will be able to feel when contact is first made with the chain. This represents the lower or downward extent of free movement of the upper strand 28 of chain 10. The user then notes the particular gradation on the indicator section of the tool that aligns with the top edge 72 of the opening 26. The user then moves the tool upwardly, by moving the handle upwardly, as far as the user can. This pushes the upper strand 28 of chain 10 to the upper limit of its free upward movement. The user then notes the particular gradation on the indicator section of the tool that then aligns with the top edge 72 of the opening 26. The user determines how many gradations the indicator portion of the tool has moved in relation to the top edge 72. This represents the amount of free up and down movement of the upper strand 28 of chain 10. The user can then adjust the position of the chain adjustment shoe, if necessary, up or down to tighten or loosen the chain 10 to provide the proper amount of free up and down movement of the upper strand 28 of chain 10. The tool is used to measure the free up and down movement of the upper strand 28 with each adjustment until the proper adjustment is achieved. When properly adjusted, the tool is removed and the primary chain adjustment inspection cover 20 is replaced over the opening 26 and sealed with a new gasket 24 in normal manner.

For example, if the gradations are spaced at one eighth inch intervals along the indicator section of the tool and the user determines that the tool moves upwardly three gradations in measuring the free upward movement of the chain, the user knows that the free movement of the chain is three eighths of an inch. This is the minimum movement for a chain in the Harley Davidson motorcycles mentioned above with the engine hot. If the engine is cold, this three eighths of an inch is below the five eighths of an inch minimum specified. If the engine is cold, the user would loosen nut 42 and adjust the position of the adjustment shoe 32 downwardly to loosen the chain slightly. The user would then tighten nut 42 to secure the adjustment shoe 32 in adjusted position and again measure the free up and down movement of the upper strand 28 of the chain to determine if it is then within the required range of the five eighths to seven eighths of an inch. If so, the adjustment is finished. If either still too tight or if too loose, the user then readjusts the adjustment shoe 32 and again measures the free movement of the upper chain strand. This continues until the chain is properly adjusted. During the adjustment of the adjusting shoe, the user could use the tool of the invention to move and tension the chain to help determine the adjustment of the adjustment shoe.

While the tool has been described specifically for use in determining the free movement of the upper strand of the primary chain in a motorcycle, it should be realized that the tool can be used in similar manner to adjust the tension of a belt or other strand of material where a user has a reference from which the user can determine the movement of the tool, and thus the movement of the strand from the interaction of the reference and indicator section of the tool.

Whereas the invention is here illustrated and described with reference to an embodiment thereof presently contemplated as the best mode of carrying out the invention in actual practice, it is to be understood that various changes may be made in adapting the invention to different embodiments without departing from the broader inventive concepts disclosed herein and comprehended by the claims that follow.

The invention claimed is:

1. A tool for measuring movement of a strand of chain extending between sprockets in a direction substantially transverse to the length of the strand, comprising:
   a handle section by which the tool is held and manipulated by a user;
   a chain engaging section for engaging the strand of chain whose movement is to be measured at a desired location along the strand of chain between the sprockets; and
   an indicator section joining the handle section and the chain engaging section and having indicia thereon usable to determine the movement of the tool as the tool is used to move the chain strand engaged by the chain engaging section.

2. A tool for measuring movement of a strand of chain according to claim 1, wherein the handle section is elongate and the chain engaging section is elongate.

3. A tool for measuring movement of a strand of chain according to claim 2, wherein the handle section and the chain engaging section extend along substantially parallel axes.

4. A tool for measuring movement of a strand of chain according to claim 3, wherein the indicator section extends substantially transverse to the handle and chain engaging sections.

5. A tool for measuring movement of a strand of chain according to claim 4, wherein the indicia on the indicator section is a series of gradations extending along the indicator section.

6. A tool for measuring movement of a strand of chain according to claim 5, wherein the gradations are spaced at eighth inch intervals.

7. A tool for measuring movement of a strand of chain according to claim 6, wherein a plurality of fifth gradations are different than other gradations.

8. A tool for measuring movement of a strand of chain according to claim 7, wherein the tool is formed of a rod bent to form the handle section, the indicator section, and the chain engaging section.

9. A tool for measuring movement of a strand of chain according to claim 8, wherein the handle section additionally includes a handle secured to the rod forming the handle section.

10. In a motorcycle having a primary chain extending between two sprockets in a primary chain case which has a primary chain adjustment inspection cover which is removable to provide an opening into the primary chain case, a method of measuring movement of an upper strand of the primary chain, comprising the steps of:
   obtaining a tool comprising a handle section by which the tool is held and manipulated by a user; a chain engaging section for engaging the strand of chain whose movement is to be measured at a desired location along the strand of chain between the sprockets; and an indicator section joining the handle section and the chain engaging section and having indicia thereon usable to determine the movement of the tool as the tool is used to move the chain strand engaged by the chain engaging section;
   inserting the chain engaging section and the indicator section inside the primary chain case with the handle section extending through the opening to outside the primary chain case;
   manipulating the tool so that the chain engaging section engages the chain at a desired location along the strand of chain, and so that the indicia on the indicator section is positioned in a known relationship with respect to an edge of the opening;
   and moving the tool and chain through a movement of the chain to be measured and determining the amount of movement of the chain by determining the amount of movement of the tool as the indicia moves with respect to the edge of the opening.

11. A tool for measuring movement of a strand of material extending between respective material strand engagement means in a direction substantially transverse to the length of the strand, comprising:
   a handle section by which the tool is held and manipulated by a user;
   a strand engaging section for engaging the strand of material whose movement is to be measured at a desired location along the strand of material between the respective material strand engagement means; and
   an indicator section joining the handle section and the chain engaging section and having indicia thereon usable to determine the movement of the tool as the tool is used to move the strand engaged by the strand engaging section.

12. A tool for measuring movement of a strand of material according to claim 11, wherein the handle section is elongate and the strand engaging section is elongate.

13. A tool for measuring movement of a strand of material according to claim 12, wherein the handle section and the strand engaging section extend along substantially parallel axes.

14. A tool for measuring movement of a strand of material according to claim 13, wherein the indicator section extends substantially transverse to the handle and chain engaging sections.

15. A tool for measuring movement of a strand of material according to claim 14, wherein the indicia on the indicator section is a series of gradations extending along the indicator section.

16. A tool for measuring movement of a strand of material according to claim 15, wherein the gradations are spaced at eighth inch intervals.

17. A tool for measuring movement of a strand of material according to claim 16, wherein a plurality of fifth gradations are different than other gradations.

18. A tool for measuring movement of a strand of material according to claim 17, wherein the tool is formed of a rod bent to form the handle section, the indicator section, and the chain engaging section.

19. A tool for measuring movement of a strand of material according to claim 18, wherein the handle section additionally includes a handle secured to the rod forming the handle section.

* * * * *